(12) United States Patent
Yu et al.

(10) Patent No.: US 7,284,035 B2
(45) Date of Patent: Oct. 16, 2007

(54) SYSTEM FOR WIRELESS PUSH AND PULL BASED SERVICES

(75) Inventors: Shun Zheng Yu, Plainsboro, NJ (US); Hisashi Kobayashi, Princeton, NJ (US)

(73) Assignee: Princeton University, Princeton, NJ (US)

( * ) Notice: Subject to any disclaimer, the term of this patent is extended or adjusted under 35 U.S.C. 154(b) by 392 days.

(21) Appl. No.: 11/118,527

(22) Filed: Apr. 29, 2005

(65) Prior Publication Data

US 2005/0193096 A1 Sep. 1, 2005

Related U.S. Application Data

(63) Continuation of application No. 09/591,746, filed on Jun. 12, 2000, now Pat. No. 7,058,691.

(51) Int. Cl.
G06F 9/00 (2006.01)
(52) U.S. Cl. .................. 709/207; 709/224; 709/229; 455/405; 713/201
(58) Field of Classification Search ........... 709/207, 709/222, 224, 229; 455/405, 456; 707/20; 713/201
See application file for complete search history.

(56) References Cited

U.S. PATENT DOCUMENTS

| | | | |
|---|---|---|---|
| 5,151,989 A | 9/1992 | Johnson et al. ............... 707/10 |
| 5,774,660 A * | 6/1998 | Brendel et al. ............. 709/201 |
| 5,787,470 A | 7/1998 | DeSimone et al. ......... 711/124 |
| 5,825,759 A | 10/1998 | Liu ............................ 370/331 |
| 5,864,837 A | 1/1999 | Maimone ...................... 707/1 |
| 5,873,100 A | 2/1999 | Adams et al. .............. 707/204 |
| 5,925,100 A | 7/1999 | Drewry et al. ............. 709/219 |
| 5,931,904 A | 8/1999 | Banga et al. ............... 709/219 |
| 5,935,207 A | 8/1999 | Logue et al. ............... 709/219 |
| 5,991,306 A | 11/1999 | Burns et al. ................ 370/429 |
| 6,003,082 A | 12/1999 | Gampper et al. ........... 709/225 |
| 6,029,195 A | 2/2000 | Herz .......................... 725/116 |
| 6,085,193 A | 7/2000 | Malkin et al. ............... 707/10 |
| 6,119,167 A | 9/2000 | Boyle et al. ................ 709/234 |
| 6,173,311 B1 | 1/2001 | Hassett et al. ............. 709/202 |
| 6,393,481 B1 | 5/2002 | Deo et al. ................... 709/224 |
| 6,400,996 B1 * | 6/2002 | Hoffberg et al. ............. 700/83 |

(Continued)

OTHER PUBLICATIONS

Fielding et al., "Hypertext Transport Protocol—HTTP/1.1," Network Working Group RFC, May 1996.

(Continued)

*Primary Examiner*—Khanh Dinh
(74) *Attorney, Agent, or Firm*—Mathews, Shepherd, McKay & Bruneau, P.A.

(57) ABSTRACT

The present invention relates to a method and system for providing Web content from pull and push based services running on Web content providers to mobile users. A proxy gateway connects the mobile users to the Web content providers. A prefetching module is used at the proxy gateway to optimize performance of the pull services by reducing average access latency. The average access latency can be reduced by using at least three factors: one related to the frequency of access to the pull content; second, the update cycle of the pull content determined by the Web content providers; and third, the response delay for fetching pull content from the content provider to the proxy gateway. Pull content, such as documents, having the greatest average access latency are sorted and a predetermined number of the documents are prefetched into the cache. Push services are optimized by iteratively estimating a state of each of the mobile users to determine relevant push content to be forward to the mobile user.

10 Claims, 5 Drawing Sheets

U.S. PATENT DOCUMENTS

| | | | |
|---|---|---|---|
| 6,421,781 B1 | 7/2002 | Fox et al. | 713/201 |
| 6,604,104 B1 | 8/2003 | Smith | 707/10 |
| 6,697,103 B1 | 2/2004 | Fernandez et al. | 348/143 |
| 7,058,691 B1* | 6/2006 | Yu et al. | 709/207 |
| 7,062,272 B2* | 6/2006 | Grilli et al. | 455/435.1 |
| 7,237,017 B1* | 6/2007 | Pecus et al. | 709/223 |
| 2002/0151992 A1* | 10/2002 | Hoffberg et al. | 700/83 |
| 2006/0200259 A1* | 9/2006 | Hoffberg et al. | 700/86 |
| 2007/0016476 A1* | 1/2007 | Hoffberg et al. | 705/14 |

OTHER PUBLICATIONS

Z. Jiang and L. Kleinrock, "An Adaptive Network Prefetch Scheme," IEEE Journal on Selected Areas in Communications, vol. 16, No. 3, pp. 358-368, Apr. 1998.

Z. Jiang and L. Kleinrock, "Web Prefetching in a Mobile Environment," IEEE Personal Communications, vol. 5, No. 5, pp. 25-34, Oct. 1998.

E.P. Markatos, "Main Memory Caching of Web Documents," Computer Networks and ISDN Systems, vol. 28, Issues 7-11, pp. 893-906, 1996.

K. Chinen and S. Yamaguchi, "An Interactive Prefetching Proxy Server for Improvement of WWW Latency," INET '97, Kuala Lumpur, Malaysia, 1997.

Wireless Application Protocol Architecture Specification, Wirelesss Application Protocol Forum, Ltd. Version 30, Apr. 1998.

Wireless Application Protocol Push Architectural Overview, Wireless Application Protocol Forum, Ltd., Version 08, Nov. 1999.

* cited by examiner

SYSTEM FOR WIRELESS PUSH AND PULL BASED SERVICES

CROSS REFERENCE TO RELATED APPLICATION

This application claims the benefit of U.S. patent application Ser. No. 09/591,746, filed Jun. 12, 2000, now U.S. Pat. No. 7,058,691 the entirety of which is hereby incorporated by reference into this application.

BACKGROUND OF THE INVENTION

1. Technical Field

The invention relates to a proxy gateway for providing improved push and pull based services from a content provider on the Internet to a mobile user on a wireless network.

2. Description of Related Art

The Internet is a global network formed by the cooperative interconnection of computing networks. The Worldwide Web (WWW or Web) is a collection of files or "Web pages" of text, graphics and other media which are connected by hyperlinks to other Web pages which physically reside on the Internet. In a transaction on the WWW, a Web client typically requests information from a Web server. The requested information is transmitted from the Web server to the Web client over the Internet. Dramatically increasing expansion of Internet services using the WWW has led to increased Web traffic.

A conventional technique to reduce Web traffic and speed up Web access is to store copies of documents in a cache. U.S. Pat. No. 5,873,100 describes an Internet browser which includes an embedded cache for user controlled document retention. The cache stores a plurality of documents. At least one of the documents stored in the cache is designated as a keep document. If the storage limit of the cache is exceeded, the cache deletes the oldest document not designated as a keep document.

Web servers and Web client use hypertext transfer protocol (HTTP)/1.1 which includes cache control features. See R. Fielding et al., "Hypertext Transport Protocol HTTP/1.1" Network Working Group RFC, May 1996, URL: ftp://ftp.isi.edu/in-notes/rfc2068.txt. The original Web server assigns expiration times to responses generated for Web client requests. An expiration judgment is performed in the cache when a cached entry is requested by a client. If the cached entry has not expired, the cache sends the entry to the client; otherwise, it sends a conditional request to the Web server. A validation check is performed at the Web server to validate if the cached entry is still useable. If the cached entry is useable, the Web server sends a validator to the Web client; otherwise, it sends an updated response.

In certain systems, there exists very little local memory. In these systems, caching and prefetching is preferably performed at a proxy server intermediate between the Web server and the Web client. Prefetching is a technique in which additional items are fetched when a request is made for a particular item. U.S. Pat. No. 5,925,100 describes a system having a dumb client environment in which a smart server determines when to send a prefetched object to the user. The prefetched objects are determined based on an object based prefetch primitive present in the client's executing application.

Other conventional prefetch schemes are based on predicting at a given time the likelihood that a given document will be accessed in the near future. Prefetch schemes have been described in which a prediction module computes the access probability that a file will be requested in the near future. Each file whose access probability exceeds a server's prefetch threshold is prefetched. See Z. Jiang and L. Kleinrock, "An Adaptive Network Prefetch Scheme," *IEEE J. on Selec. Areas in Common.*, vol. 16, no. 3, April 1998, pp. 358-368, and Z. Jiang and L. Kleinrock, "Web Prefetching in a Client Environment," *IEEE Personal Communications*, vol. 5, no. 5, October 1998, pp. 25-34.

In addition, prefetch schemes have been described which are based on popularity based prefetching. See E. P. Markatos, "Main Memory Caching of Web Documents," *Computer Networks and ISDN Systems*, vol. 28, issues 7-11, pp. 893-906, 1996. Main menu caching of frequently requested documents is performed on the Web server. Similarly, U.S. Pat. No. 5,991,306 describes a pull based intelligent caching system for delivering data over the Internet. Content of frequently requested documents is downloaded from the content provider and cached at a local service provider. The content is cached prior to a peak time when subscribers are likely to request the content. A pattern recognizer detects behavior patterns based on subscriber requests to determine which content the subscribers are most likely to request and when. When content is finally requested, the data is streamed continuously for rendering at the subscriber computer.

Another prefetching scheme type is based on interactive prefetching in which prefetching is determined by the interaction between the client and the server. For example, an interactive prefetching scheme has been proposed in which the system gathers references by passing hypertext markup language (HTML) in the referenced page and collecting referenced pages with each request. See K. Chinen and S. Yamaguchi, "An Interactive Prefetching Proxy Server for Improvement of WWW Latency," INET'97, Kuala Lumpur, Malaysia, 1997.

Wireless systems and mobile users are typically limited to small bandwidth and small memory. A wireless application protocol (WAP) has been developed to promote industry-wide specifications for technology useful in developing applications and services, such as Internet services, that operate over wireless communication networks, as described in Wireless Architecture Protocol Specification, Wireless Application Protocol Forum, Ltd., Version 30, April 1998 and WAP Push Architectural Overview, Version 08, November 1999. WAP framework defines pull technology as a transaction initiated by the client to pull information from a server. For example, the World Wide Web is an example of pull technology in which a user enters a universal resource locator (URL) which is sent to the server and the server sends a Web page to the user. WAP framework defines push technology as a transmission to the client without previous action by the client. Accordingly, the server pushes information to the client without an explicit request from the client. It is desirable to provide a system for wireless push and pull based Internet services which expeditiously allows users to gain access to desired Web information.

SUMMARY OF THE INVENTION

The present invention relates to a method and system for providing Web content from pull and push based services running on Web content providers to mobile users. A proxy gateway connects the mobile users to the Web content providers. A prefetching module is used at the proxy gateway to optimize performance of the pull services by reducing average access latency. The prefetch module prioritizes pull content to be stored in a cache at the proxy gateway. The average access latency can be reduced by using at least one factor related to the frequency of access to the pull content, the update cycle of the pull content determined by the Web content providers and the response delay for fetching pull content from the content provider to the proxy gateway. Pull content, such as documents, having the greatest average access latency are sorted and a predetermined number of the documents are prefetched into the cache. Push services are optimized by iteratively estimating a state of each of the mobile users to determine relevant push content to be forward to the mobile user. The estimate of the state of each mobile user can be determined from tracking information of the mobile user and geo-location measurement and behavior observation data.

The invention will be more fully described by reference to the following drawings.

DETAILED DESCRIPTION

Figure 1:
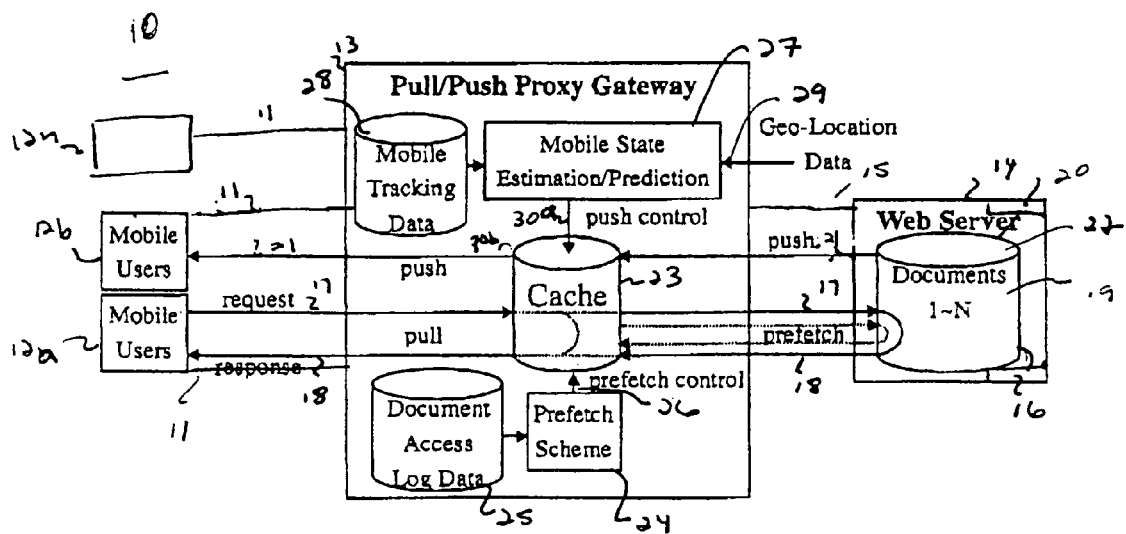
FIG. 1 is a schematic diagram of a system for providing push and pull based services to mobile users.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a schematic diagram of a system for providing push and pull based services to mobile users 10. Mobile users 12a-12n are connected by mobile network 11 to proxy gateway 13. For example, mobile network 11 is a wireless network. Web server 14 is connected by network 15 to proxy gateway 13. For example, network 15 can be a wired network, such as the Internet.

Each of mobile users 12a-12n can interact with pull service 16 and push service 20 running on content provider 14, such as a Web server. As an example of pull service 16, mobile user 12a generates a pull request 17 which is transmitted over network 11 to gateway 13. Pull request 17 is transmitted via proxy gateway 13 to pull service 16. Mobile user 12a receives pull response 18 generated by pull service 16 at content provider 14 via proxy gateway 13. Pull response 18 includes pull content 19 stored or generated by content provider 14. As an example of push service 20, push message 21 is sent by push service 20 to mobile user 12b. Push message 21 includes push content 22 stored or generated at content provider 14. Push message 21 is sent by content provider 14 to proxy gateway 13. Push message 21 is forwarded by proxy gateway 13 to mobile user 12b.

Pull service 16 and push service 20 interact with cache 23, as described below. Pull response 18 generated by content provider 14 can be prefetched and cached in cache 23. Thereafter, when pull request 17 identifies a pull response 18 stored in cache 23, pull response 18 stored in cache 23 can be forwarded to mobile user 12a, or any other mobile user 12b-12n, without contacting content provider 14. Prefetch module 24 reduces access latency of pull service 16 using document access log data 25 to determine prefetch control information 26 for prefetching a predetermined number of pull responses 18 into cache 23. Unprefetched pull response 18 is cached by using a conventional caching mechanism, such as HTTP/1.1 caching. Mobile state estimation pedication module 27 uses mobile tracking data 28 and geo-location measurement and behavior observation data 29 to determine push control information 30a for controlling caching of push messages 21 in cache 23 and for determining timing for sending relevant push content to the mobile user 30b depending on the state of mobile user 12b. It will be appreciated that multiple pull services 16 and push services 20 can be provided at content provider 14 or a plurality of content providers 14 and accessed by multiple mobile users 12a-12n. Pull content 19 and push content 22 can comprise, for example, documents including Hypertext Markup Language (HTML) files, Java files, and embedded data including images, video files and audio files.

Figure 2:
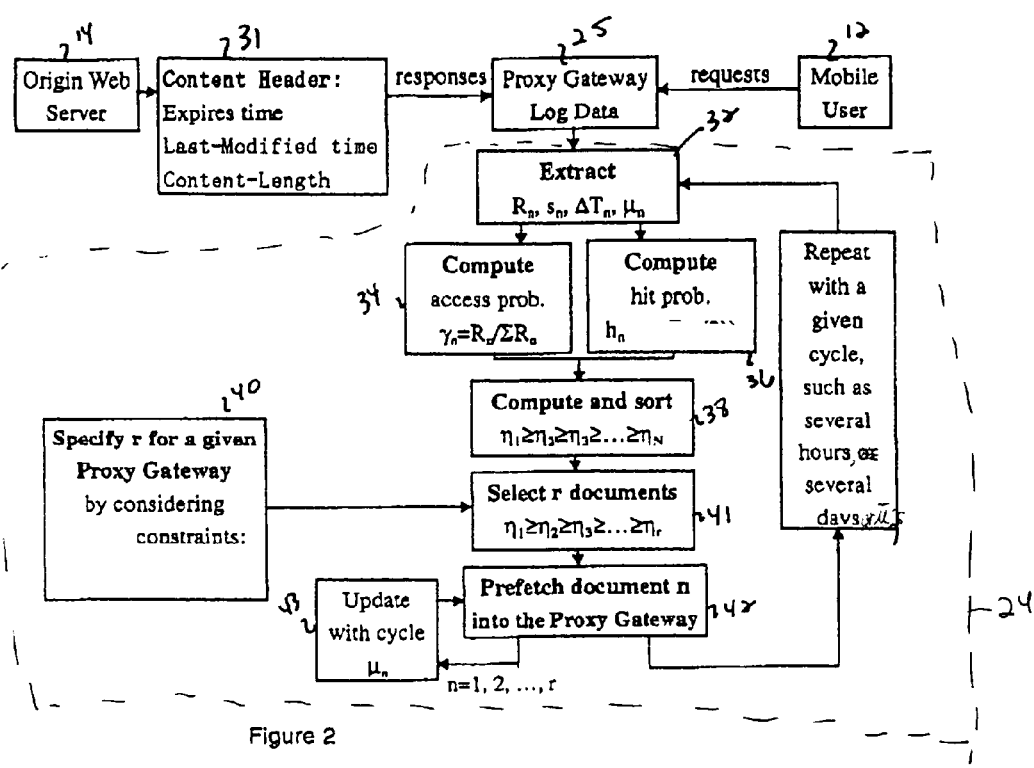
FIG. 2 is a flow diagram of an implementation of a prefetch module used in a proxy gateway of the system.

FIG. 2 illustrates a flow diagram for performing prefetch module 24. Prefetch module 24 optimizes performance of pull service 16 by reducing average access latency using at least one factor related to the frequency of access to pull content 19, the update cycle of pull content 19, and the response delay for fetching pull content 19 from Web server 14 to cache 23. Access latency is defined as the time between when pull request 17 is transmitted from a mobile user 12a-12n to the time when pull response 18 is received at a mobile user 12a-12n. Web server 14 generates content header 31 which is forwarded as a header of pull response 18. For example, content header 31 can include fields as defined in HTTP/1.1 such as: Expires time, relating to the expiration time of pull content 19; Last-Modified time, relating to the time pull content 19 was last modified at Web server 14; and Content-Length, relating to the size of pull content 19. Proxy gateway 13 receives content header 31 and stores fields of content header 31 in document access log data 25. Proxy gateway 13 also receives pull request 17 and stores fields related to pull request 17. Fields related to cache 23 are also stored in document access log data 25. For example, fields stored in document access log data 25 can include fields such as: request_time, related to the local time when proxy gateway 13 made pull request 17 to content provider 14; and response_time, related to the local time when cache 23 received pull response 18 from content provider 14.

In block 32, variables related to pull service 16 are extracted from document access log data 25. For example, the extraction block 35 can calculate the parameters associated with potential candidates that may be included into the list of the prefetched documents. The document that has only one access record (i.e., no revisit) in the log or has not more than one update cycle during the statistic period is not treated as a potential candidate. Let $R_n$ be the average rate of access to pull content 19. Pull content 19 is referred to as document n. $R_n$ can be determined at proxy gateway 13 based on log data of cache 23 and content header 31 of pull responses 18 from content providers 14 and stored in document access log data 25. Let $s_n$ be the size of document n. For example, $s_n$ can be determined from the Content-Length field forwarded by content provider 14 and stored in document access log data 25.

Let $\Delta T_n$ be the average response delay imposed by network 15 which can be measured by the time from when pull request 17 from a mobile user 12a-12n is reformatted and forwarded by proxy gateway 13 to content provider 14 to when pull content 19 is fetched from or validated by content provider 14 to cache 23, i.e. which can be measured by the difference between the logged request_time and response_time. $T_{s,n}$ is the average time delay imposed by network 11 and network 15, which is the time from when, pull request 17 is generated from mobile user 12a where pull request 17 is reformatted and is forwarded by proxy gateway 13 to content provider 14 and pull content 19 is fetched from or validated by content provider 14 as pull response 18 to proxy gateway 13 to when response 18 is received by mobile user 12a. $T_{c,n}$ is the average time delay imposed by network 11, which is the time between the generation of pull request 17 from mobile user 12a and the reception of pull response 18 by mobile user 12a when a valid copy of pull content 19, document n, is found in cache 23, including transmission time of pull response 18, roundtrip time from cache 23 to mobile user 12a and cache 23 processing time. Approximately, $\Delta T_n = T_{s,n} - T_{c,n}$. Let $\mu_n$ be the update cycle of pull content 19, document n, which is the average length of time between two successive expiration times or two successive modifications of pull content 19, document n.

Figure 3:
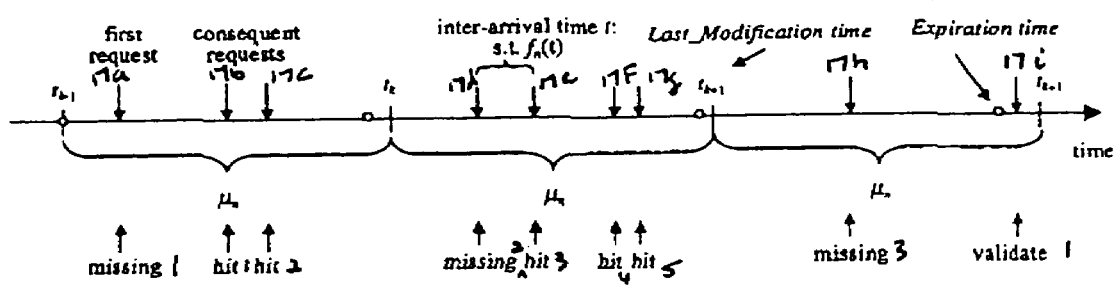
FIG. 3 is an illustration of a caching model.

The caching model of HTTP/1.1 is illustrated in FIG. 3 in which $t_k$ represents the Last_Modified time and "o" represents the Expires time of pull content 19, document n generated by Web server 14. Cache 23 is accessed by a group of mobile users 12a-12n and N is the total number of documents n residing in various Web servers 14 with n=1, ... N. Pull request 17a generated by one of mobile users 12a-12n and forwarded to cache 23 in cycle, $\mu_n$, cannot be satisfied by cache 23 which is denoted by missing 1. Cache 23 fetches a copy of pull content 19 for pull request 17a from Web server 14. Consequent pull requests 17b and 17c generated by one of mobile users 12a-12n in cycle, $\mu_n$, are satisfied by cache 23 which is denoted by hit 1 and hit 2. Thereafter, in a second cycle, $\mu_n$, pull request 17d generated by one of mobile users 12a-12n and forwarded to cache 23 in cycle, $\mu_n$, cannot be satisfied by cache 23 which is denoted by missing 2. Cache 23 fetches a fresh copy of pull content 19 for pull request 17d from Web server 14. Consequent pull requests 17e-g generated by one of mobile users 12a-12n in cycle, $\mu_n$, are satisfied by cache 23 which are denoted respectively by hits 3-5. In a third cycle, $\mu_n$, pull request 17h generated by one of mobile users 12a-12n and forwarded to cache 23 in cycle, $\mu_n$, cannot be satisfied by cache 23 which is denoted by missing 3. Thereafter, pull request 17i generated by one of mobile users 12a-12n arrives at cache 23 between the expiration time and end of cycle, $\mu_n$. In this case, cache 23 validates pull content 19 at Web server 14, represented by validate 1, before using pull content 19 stored in cache 23. The distribution of interarrival time of pull requests 17a-17i to pull content 19 represented by document n is represented by $f_n(t)$ which can be an exponential distribution. Since Web server 14 typically specifies the expires time based on its schedule to the end of cycle, $\mu_n$, the interval between the Expires time and the end of the cycle can have a stochastic or deterministic distribution.

In block 34 of FIG. 2, the access probability of access to document n, represented by $\gamma_n$ is determined by:

$$\gamma_n = R_n/R \tag{1}$$

wherein R is the total rate of access traffic on network 15 from gateway 13, which is the sum of $R_n$ for n=1, 2, ..., N.

In block 36, the average hit rate for document n, represented by $h_n$, is determined by:

$$h_n = 1 - \frac{g_n}{R_n \mu_n}, n = 1, 2, \ldots, N, \tag{2}$$

in which:

$g_n$ is the probability that there is at least one request to document n during a given update cycle, $\mu_n$, given by:

$$g_n = 1 - e^{-R_n \mu_n}, n=1, 2, \ldots, N, \tag{3}$$

and $R_n \mu_n$ is the expected number of accesses to document n in an update cycle of document n.

In block 38, the wired network access latency, represented by $\eta_n$, imposed by network 15 when the request is the first one for document n in the update cycle $\mu_n$ or Expires time for document n has been exceeded, as shown in FIG. 3, is computed from:

$$\eta_n = \gamma_n(1-h_n)\Delta T_n, n=1, \ldots, N, \tag{4}$$

The values at $\eta_n$, n=1, ..., N are sorted in descending order with document 1 having the greatest average latency imposed by network 15 labeled as $\eta_1$, and document N having the least average latency labeled as $\eta_N$ and relabeled as: $\eta_1 \geq \eta_2 \geq \eta_3 \geq \ldots \geq \eta_N$.

In block 40, the total number of documents n to be prefetched to cache 23, represented by r, is determined by considering at least one factor. Examples of factors include: spare capacity of cache 23 that can be utilized by the prefetching after providing sufficient capacity for conventional caching, $\Delta C$; spare transmission bandwidth, $\Delta B$, of network 15; and desired improvement of hit probability, $\Delta H$. The total number of documents to be prefetched represented by r satisfies all of the following constraints:

The constraint of spare cache capacity, $\Delta C$, is given by $$\sum_{n=1}^{r} s_n(1-h_n) \leq \Delta C; \tag{5}$$

where $$\Delta C \approx C - \sum_{n=1}^{N} s_n h_n,$$

C is given capacity of cache 23 and $$\sum_{n=1}^{N} s_n h_n$$

is the capacity required for conventional caching such as described in the caching model of HTTP/1.1.

The constraint of spare transmission bandwidth, $\Delta B$, on network 15 is given by:

$$\sum_{n=1}^{r}(1-g_n)\frac{s_n}{\mu_n} \leq \Delta B; \tag{6}$$

where $\Delta B \approx B - \sum_{n=1}^{N} g_n \frac{s_n}{\mu_n}$,

B is given bandwidth and $$\sum_{n=1}^{N} g_n \frac{s_n}{\mu_n}$$

is the bandwidth required for conventional caching.

The constraint of desired minimum improvement of hit probability, $\Delta H$, is given by:

$$\sum_{n=1}^{r} \gamma_n(1-h_n) \geq \Delta H \tag{7}$$

where $$\Delta H \approx H - \sum_{n=1}^{N} \gamma_n h_n,$$

H is given hit probability, and $$\sum_{n=1}^{N} \gamma_n h_n$$

is the total average hit probability for conventional caching.

In block 41, the total number of documents to be prefetched to cache 23, r, that correspond to the r largest are selected and relabeled as $\eta_1, \ldots, \eta_r$. In block 42, the documents determined in block 41 are prefetched into cache 23 at proxy gateway 13 as soon as the documents expire at cache 23, which means the prefetched document n in cache 23 is updated with average cycle, $\mu_n$, as shown in block 43. Thereafter, blocks 32-43 are repeated with a given period, such as several hours, several days, or several times the expected update cycle, $\bar{\mu}$, is represented by:

$$\bar{\mu} = \sum_{h=1}^{N} \gamma_n \mu_n \tag{8'}$$

Accordingly, average latency for pull service 16 is derived as:

$$L = \sum_{n=1}^{N} \gamma_n [h_n T_{c,n} + (1-h_n) T_{s,n}] - \sum_{n=1}^{r} \eta_n \tag{8}$$

In Eq. (8), the first term is the latency of a conventional cache scheme and is independent of the prefetch scheme used and the second term $$\sum_{n=1}^{r} \eta_n$$

is the latency reduction as a result of prefetch scheme of the present invention. The latency reduction is determined by the number r and the selection of r prefetched documents. Thus, performance of blocks 32-43 minimizes the average latency L.

Figure 4:
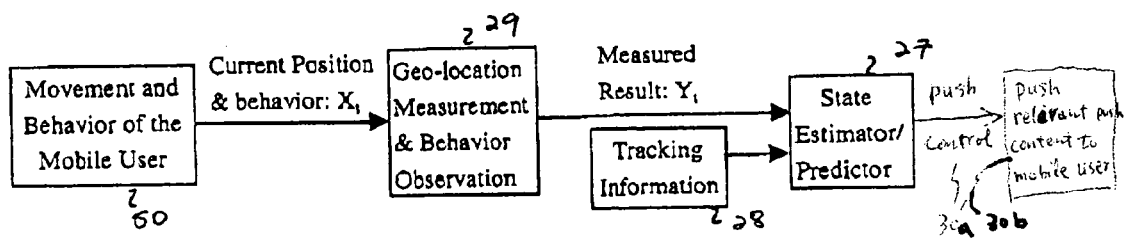
FIG. 4 is a schematic diagram for providing push services of the system.

FIG. 4 illustrates a schematic diagram for providing push services of the system. Movement and behavior of the mobile user 50 is measured by geo-location measurement and behavior observation block 29. An example of movement and behavior of the mobile user data 50 is represented in Table 1 illustrating examples of different states a mobile user 12a-12n can occupy.

TABLE 1

Mobile States

| State | Description | Position and Behavior | Time | Speed | Direction | Mean dwell time in the state |
|---|---|---|---|---|---|---|
| State 0 | Inactive (power off or out off location-dependent services). | — | — | — | — | $d_0$ |
| State 1 | Walking on a street. | $X_1$ | $t_1$ | $\approx 1$ m/s | along one direction | $d_1$ |
| State 2 | In a shopping mall. | $X_2$ | open hours | $\approx 0$ | | $d_2$ |
| State 3 | Drive on a highway. | $X_3$ | $t_3$ | $\approx 30$ m/s | along one direction | $d_3$ |
| ⋮ | ⋮ | | | | | ⋮ |
| State M-1 | | | | | | $d_{MH}$ |

State 0 is an inactive state in which mobile user 12a-12n can occupy when powering off its mobile terminal or is out of location-dependent services of wireless network 11. State 1 to State M−1 are active states which mobile user 12a-12n can occupy while being actively involved with network 11 and interacting with pull service 16 and push service 20. Each state is determined by several parameters such as: position and behavior of mobile user 12a-12n, at time t represented by $X_t$, time of determining state, represented by t; speed of mobile user 12a-12n; direction of movement of mobile user 12a-12n; and mean dwell time in state m, represented by $d_m$ wherein M is the total number of distinct states defined for mobile user 12a-12n, and m=0, 1, . . . , M−1. $Y_t$ represents the results of geo-location position measurement and behavior observations of mobile user 12a-12n at time t. It is observed that $Y_t$ is the observed or measured value of the position and behavior of mobile user 12a-12n and is in general different from $X_t$ which is the true, but unknown, position and behavior because of geo-location and estimation error. Geo-location position and behavior data 29 can be estimated with conventional methods as described in J. H. Reed, K. J. Krizman, B. D. Woerner and T. S. Rappaport, "An Overview of the Challenges and Progress in Meeting the E-911 Requirement for Location Service", IEEE Communications Magazine, Vol. 36, No. 4, April 1998, pp. 30-37, hereby incorporated by reference into this application.

$S_t$ is the state of mobile user 12a-12n at time t wherein $S_t \in \{0, 1, \ldots, M-1\}$.

Mobile user 12a-12n can transit from one state to another. The transit mobility of one of mobile users 12a-12n, mobile user 12, can be represented by an M-state Markov chain with transition probability matrix (TPM):

$$P = [P_{mn}]_{M \times M} \quad (9)$$

where the $P_{mn}$ is the probability of transition from state m to state n, and m, n=0, 1, . . . , M−1.

Tracking data 28 represents sequence data of mobile user 12 over time. Tracking data 28 includes $Y_1^t$ and $\{\alpha_\tau(m), \tau=1, \ldots, t, m=1, \ldots, m-1\}$ $S_1^t$ represents the state sequence of mobile user 12 from time 1 to t. $X_1^t$ represents the corresponding position and behavior sequence of mobile user 12 from time 1 to t.

$Y_1^t$ represents the corresponding geo-location and observation sequence of mobile user 12 from time 1 to t. Mobile state prediction module 27 can generate push control in information 30 for controlling caching of push content 22 and for determining timing for sending push content 30b in cache 23 to mobile user 12 based on determined states.

Figure 5:
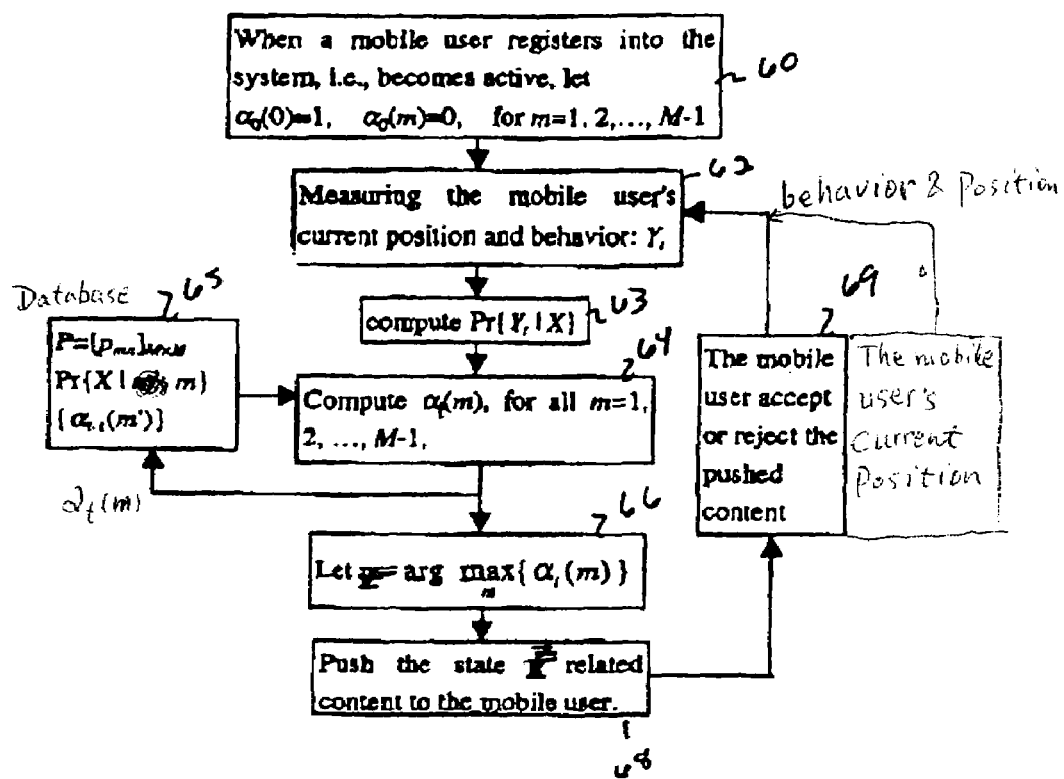
FIG. 5 is a flow diagram of an implementation of the mobile state prediction.

FIG. 5 is a flow diagram of an implementation of mobile state prediction module 27. Mobile state prediction module 27 estimates the posteriori probability of the states of mobile user 12a-12n for a given geo-location and observation sequence, $Y_1^t$.

In block 60, the initial state of mobile user 12a-12n is defined upon registration of mobile user 12a-12n in system 10. Let $\alpha_t(m)$ represent a forward variable for state sequence estimation which is a probability that the State at time t is m and the corresponding geo-location and observation sequence is $Y_1^t$.

The forward variables for state sequence estimation for mobile user 12 in the initial time are:

$\alpha_0(0)=1, \alpha_0(m)=0,$ for $m=1, 2, \ldots, M-1.$

In block 62, a measured or observed value of a current geo-location position and behavior of mobile user 12, $Y_t$, is determined for determining geo-location measurement and behavior observation data 29.

In block 63, the probability $Pr\{Y_t|X\}$ that the geo-location measured result is $Y_t$ when mobile user 12 position and behavior is X is predetermined by the geolocation and observation error distribution.

In blocks 65 the values required for iteration are stored in a database which values can be mobile tracking data 28. In block 64, state sequence estimation variable $\alpha_t(m)$ for all m=1, 2 . . . M−1 is determined, which is stored into the database for the next recursive computation.

The following analysis can be used for performing block 64. At time t, tracking data is represented by: $Y_1^t = (Y_1, Y_2, \ldots, Y_{t-1}, Y_t)$ where $Y_t$ is the current measured data of the position and the behavior of mobile user 12 from the geo-location measurement and the collected information of proxy gateway 13. $\alpha_t(m)$ is computed for all m=1, 2, . . . , M−1, by iterations from 1 through t from the following:

$$\alpha_t(m) = \sum_{m'=0}^{M-1} Pr\{S_{t-1} = m'; S_t = m; Y_1^t\}, \quad (10)$$

$$= \sum_{m'=0}^{M-1} Pr\{S_{t-1} = m'; Y_1^{t-1}\} Pr\{S_t = m; Y_t | S_{t-1} = m'\}, \quad (11)$$

$$= \sum_{m'=0}^{M-1} \alpha_{t-1}(m') p_{m'm} \sum_{x} Pr\{x | m\} Pr\{Y_t | x\} \quad (12)$$

wherein $p_{m'm}$ is the state transition probability of mobile user 12, $Pr\{x|m\}$ is the probability that the mobile user locates at position and behavior as x when it is in state m at time t, for example the output probability of the Markov source, and $Pr\{Y_t|x\}$ is the probability that the geo-location measured result is $Y_t$ when the mobile's position and behavior is x at time t.

In block 66, state z is determined by:

$$z = \arg\max_m \{Pr\{S_t = m | Y_1^t\} | m = 1, 2, \ldots, M-1\}, \quad (13)$$

$$= \arg\max_m \left\{ \frac{Pr\{S_t = m; Y_1^t\}}{Pr\{Y_1^t\}} \middle| m = 1, 2, \ldots, M-1 \right\}, \quad (14)$$

$$= \arg\max_m \{\alpha_t(m) | m = 1, 2, \ldots, M-1\}. \quad (15)$$

Accordingly, blocks 60, 63, 64 and 66 determine mobile state prediction module 27.

In block 68, state z related push content 22 is pushed to mobile user 12a-12n as relevant push content to the mobile user 30b. In block 69, mobile user 12 may accept or reject push content 22 and this behavior is observed by block 62. The mobile user's current behavior and position is forwarded to block 62 and block 62-69 can be repeated.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method for optimizing performance of at least one pull service and at least one push service to a plurality of mobile users comprising the steps of:
   reducing access latency for said at least one pull service running on at least one Web server to optimize said at least one pull service by prefetching documents into a cache of at least one proxy gateway by using factors of a frequency of access of said plurality of mobile users to said pull content of said pull service, an update cycle of said pull content, said update cycle of pull content is the average length of time between two successive expiration times or two successive modifications of said pull content and response delay for fetching said pull content from said at least one Web server to said at least one proxy gateway, said at least one proxy gateway connected between said mobile user and said Web server; and
   iteratively estimating a state of each of said plurality of mobile users for determining push content to be forwarded to said mobile user by said at least one push service running on said at least one Web server to optimize said at least one push service;
      wherein said step of reducing access latency comprises the step of selecting a predetermined number of documents to be prefetched into cache of a proxy gateway, and said step of selecting a predetermined number of documents uses said factors of: said frequency of access, said update cycle and said response delay, wherein said frequently accessed pull documents having a shorter update cycle and a longer response delay are prioritized for being prefetched in said cache of said proxy gateway;
      wherein said step of iteratively estimating a state of each of said plurality of mobile users is determined from tracking data of said plurality of mobile users and geo-location measurement and behavior observation data.

2. The method of claim 1 wherein said pull content is plurality of documents and said step of reducing access latency further comprises the step of selecting a predetermined number of documents to be prefetched into said cache of said proxy gateway, wherein said predetermined number of documents have the greatest reduction in said access latency.

3. The method of claim 1 wherein said step of reducing access latency uses said factor of said frequency of access wherein frequently accessed documents are prioritized for being stored in a-said cache of a-said at least one proxy gateway.

4. The method of claim 1 wherein said step of reducing access latency uses said factor of said update cycle wherein said pull documents having a shorter update cycle are prioritized for being stored into a-said cache of said at least one proxy gateway.

5. The method of claim 1 wherein said access latency uses said factor of said response delay wherein said pull documents having a longer response delay are prioritized for being stored in said cache of said at least one proxy gateway.

6. The method of claim 1 further comprising the step of: caching mobility and behavior-related push content into said cache of said at least one proxy gateway.

7. The method of claim 6 wherein said state of each of said plurality of mobile users is determined from at least one of the following factors: location of said one of said plurality of mobile users, direction of said one of said plurality of mobile users, speed of said one of said plurality of mobile users, and behavior of said one of plurality of mobile users.

8. A system for providing optimization of performance at least one pull service and at least one push service to a plurality of mobile users comprising:
   means for reducing access latency for said at least one pull service running on at least one Web server by prefetching documents into a cache of a proxy gateway, said proxy gateway being connected between said mobile user and said pull service and push service by using factors of a frequency of access of said plurality of mobile users to said pull content of said pull service, an update cycle of said pull content, said update cycle of pull content is the average length of time between two successive expiration times or two successive modifications of said pull content and response delay for fetching said pull content from said at least one Web server to said at least one proxy gateway said at least one proxy gateway connected between said mobile user and said Web server; and
   means for iteratively estimating a state of each of said plurality of mobile users for determining push content to be forwarded to said mobile user by said at least one push service running on said at least one Web server to optimize said at least one push service;
   wherein said pull content is a plurality of documents and said means for reducing access latency comprises the step of: selecting a predetermined number of documents to be prefetched into cache of a proxy gateway, and selecting a predetermined number of documents uses said factors of: said frequency of access, said update cycle and said response delay, wherein said frequently accessed pull documents having a shorter update cycle and a longer response delay are prioritized for being prefetched in said cache of said proxy gateway;
   wherein said means for iteratively estimating a state of each of said plurality of mobile users is determined from tracking data of said plurality of mobile users and geo-location measurement and behavior observation data.

9. The system of claim 8 further comprising: means for controlling of caching mobility and behavior-related push content into said cache of said at least one proxy gateway.

10. The system of claim 9 wherein each-said state of one-each of said mobile users is determined from at least one of the following factors: location of said one of said plurality of mobile users, direction of said one of said plurality of mobile users, speed of said one of said plurality of mobile users, and behavior of said one of plurality of mobile users.

* * * * *